US012808414B2

(12) United States Patent
Oberdorfer

(10) Patent No.: US 12,808,414 B2
(45) Date of Patent: Nov. 24, 2026

(54) DISC BRAKE SYSTEM WITH BRAKE PAD ADAPTER PLATE, BRAKE PAD ADAPTER PLATE, AND METHODS FOR THE USE AND ASSEMBLY THEREOF

(71) Applicant: Bendix Commercial Vehicle Systems LLC, Avon, OH (US)

(72) Inventor: Erik W. Oberdorfer, Akron, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 454 days.

(21) Appl. No.: 18/532,531

(22) Filed: Dec. 7, 2023

(65) Prior Publication Data

US 2025/0189001 A1 Jun. 12, 2025

(51) Int. Cl.
*F16D 65/097* (2006.01)

(52) U.S. Cl.
CPC ................................ *F16D 65/0971* (2013.01)

(58) Field of Classification Search
CPC .... F16D 55/226; F16D 55/227; F16D 65/092; F16D 65/095; F16D 65/0971; F16D 65/0972; F16D 65/0977; F16D 65/183; F16D 69/04; F16D 2055/007; F16D 2055/0016; F16D 2065/026; F16D 2069/002; F16D 2069/004; F16D 2125/06
USPC ....................................................... 188/73.32
See application file for complete search history.

(56) References Cited

U.S. PATENT DOCUMENTS

| | | | |
|---|---|---|---|
| 4,044,864 A | 8/1977 | Karasudani | |
| 4,200,173 A | 4/1980 | Evans et al. | |
| 8,151,433 B2 | 4/2012 | Liu et al. | |
| 9,388,868 B2 * | 7/2016 | Merrien | F16D 65/0006 |
| 9,657,797 B2 | 5/2017 | Buxton et al. | |
| 9,982,730 B2 | 5/2018 | Robson et al. | |
| 10,851,857 B2 | 12/2020 | Baumgartner et al. | |
| 2005/0023091 A1 | 2/2005 | Ol et al. | |

(Continued)

FOREIGN PATENT DOCUMENTS

| | | |
|---|---|---|
| CN | 112 901 677 A | 6/2021 |
| EP | 3 450 790 A1 | 3/2019 |

(Continued)

OTHER PUBLICATIONS

International Search Report and Written Opinion for International Application No. PCT/US2024/054679 mailed Jan. 28, 2025 (15 pages).

*Primary Examiner* — Robert A. Siconolfi
*Assistant Examiner* — San M Aung
(74) *Attorney, Agent, or Firm* — Crowell & Moring LLP

(57) ABSTRACT

A disc brake system includes a carrier and an adapter plate having bearing surfaces configured to engage, or abut, when the disc brake system is actuated such that at least a portion of the adapter plate is put in tension. A brake pad includes a backing plate supported by the adapter plate and a friction material supported by the backing plate. The adapter plate has opposite leading and trailing ends defining a space therebetween, wherein the space is configured to receive a brake pad. A support plate extends between and connects the leading and trailing ends, wherein the support plate is laterally spaced from the space between the leading and trailing ends. The support plate and the leading and trailing ends define a cavity configured to receive a brake pad. A method of actuating a disc brake system is also provided.

19 Claims, 9 Drawing Sheets

(56) References Cited

U.S. PATENT DOCUMENTS

| | | | | |
|---|---|---|---|---|
| 2006/0260885 | A1 * | 11/2006 | Maehara | F16D 65/0977 188/71.1 |
| 2008/0011562 | A1 | 1/2008 | Hilbrandt | |
| 2017/0138426 | A1 | 5/2017 | Schoenauer et al. | |
| 2019/0063534 | A1 * | 2/2019 | Gibbens | F16D 69/02 |
| 2021/0048080 | A1 * | 2/2021 | Thomas | F16D 65/0087 |
| 2023/0016971 | A1 * | 1/2023 | Cho | F16D 65/847 |

FOREIGN PATENT DOCUMENTS

| | | | | |
|---|---|---|---|---|
| EP | 3 450 792 | A1 | 3/2019 | |
| GB | 2172068 | A * | 9/1986 | F16D 55/227 |
| JP | 2007 010072 | A | 1/2007 | |
| JP | 2013133912 | A | 7/2013 | |

* cited by examiner

DISC BRAKE SYSTEM WITH BRAKE PAD ADAPTER PLATE, BRAKE PAD ADAPTER PLATE, AND METHODS FOR THE USE AND ASSEMBLY THEREOF

FIELD OF THE INVENTION

The present application relates generally to a disc brake system, and in particular to a disc brake system including a brake pad adapter plate, together with methods for the use and assembly thereof.

BACKGROUND

Disc brake systems may be configured with opposing pairs of brake pads that engage a rotor to slow and/or stop a vehicle. In operation, a moment may be created between a brake pad drag force and an abutment force, which may lead to a greater amount of pressure being applied to the leading edge of the brake pad during braking. This uneven pressure distribution may lead to tapered pad wear, where the leading end of the brake pad friction material wears away faster than the trailing end. As such, the brake pads do not wear evenly and may need to be replaced more frequently.

SUMMARY

The present invention is defined by the following claims, and nothing in this section should be considered to be a limitation on those claims.

In one aspect, one embodiment of a disc brake system includes a carrier having an inboard leading pad support, an inboard trailing pad support, an outboard leading pad support, and an outboard trailing pad support, wherein the inboard leading and trailing pad supports are spaced apart and define an inboard pad receiving opening, and wherein the outboard leading and trailing pad supports are spaced apart and define an outboard pad receiving opening, wherein the inboard leading pad support comprises a first bearing surface facing away from the inboard receiving opening. An adapter plate includes opposite leading and trailing ends engaging the inboard leading pad support and the inboard trailing pad support respectively, wherein the leading end of the adapter plate comprises a second bearing surface facing toward the first bearing surface and the inboard pad receiving opening, and wherein the first and second bearing surfaces are configured to engage, or abut, when the disc brake system is actuated such that at least a portion of the adapter plate is put in tension. An inboard brake pad includes an inboard backing plate supported by the adapter plate and an inboard friction material supported by the inboard backing plate. At least a portion of the inboard backing plate and/or inboard friction material is disposed in the inboard pad receiving opening. An outboard brake pad is disposed in the outboard pad receiving opening.

In another aspect, one embodiment of a brake pad adapter plate, adapted for use in a disc brake system, includes spaced apart opposite leading and trailing ends defining a space therebetween, wherein the space is configured to receive a brake pad. The leading and trailing ends are configured to engage leading and trailing pad supports of a carrier. The leading end includes a bearing surface facing toward the space defined between the leading and trailing ends. A support plate extends between and connects the leading and trailing ends, wherein the support plate is laterally spaced from the space between the leading and trailing ends. The support plate and the leading and trailing ends define a cavity configured to receive a brake pad.

In another aspect, one embodiment of a method of actuating a disc brake system includes engaging a rotor rotating about an axis with inboard and outboard brake pads, wherein each of the inboard and outboard brake pads includes a backing plate and a friction material coupled to the backing plate, applying a friction force to the inboard and outboard brake pads in response to the engaging of the rotor, transferring the friction force applied to at least one of the inboard and outboard brake pads to an adapter plate, applying a tension force to the adapter plate, and absorbing the tension force with a carrier engaged by the adapter plate.

Various other methods of using and assembling the disc brake system are also provided.

The various embodiments of the disc brake system and brake pad adapter plate, and methods for the use and assembly thereof, provide significant advantages over other disc brake systems and methods. For example, and without limitation, the interface between the brake pad adapter plate and carrier acting in tension reduces the likelihood of tapered pad wear, such that the brake pads wear more evenly and do not need to be replaced as frequently. In addition, the adapter plate allows for conventional brake pads, not configured to absorb tension loads, to be incorporated into an improved air disc brake system where tapered pad wear is reduced. Moreover, the brake pads may be quickly and easily installed simply by sliding the brake pad into engagement with brake pad adapter plate. The brake pad adapter plate may be modular, meaning it may be suited to accommodate differently shaped and configured brake pads. In addition, conventional carriers may be modified or retrofitted to interface with the brake pad adapter simply by machining the carrier to define a bearing surface, for example by machining a slot in the carrier.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "longitudinal," as used herein means of or relating to a length or lengthwise direction 2, or X direction, for example a direction running parallel to a brake pad. The term "lateral," as used herein, means situated on, directed toward or running in a side-to-side direction 4, or Y direction, transverse to the longitudinal direction 2. The term "transverse" means non-parallel. The term "outboard" refers to a position or an OB direction facing outwardly away from a centralized location, for example a rotor 128, while the term "inboard" refers to a position or an IB direction facing inwardly relative to the rotor 128, as shown for example in FIG. 16.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Figure 16:
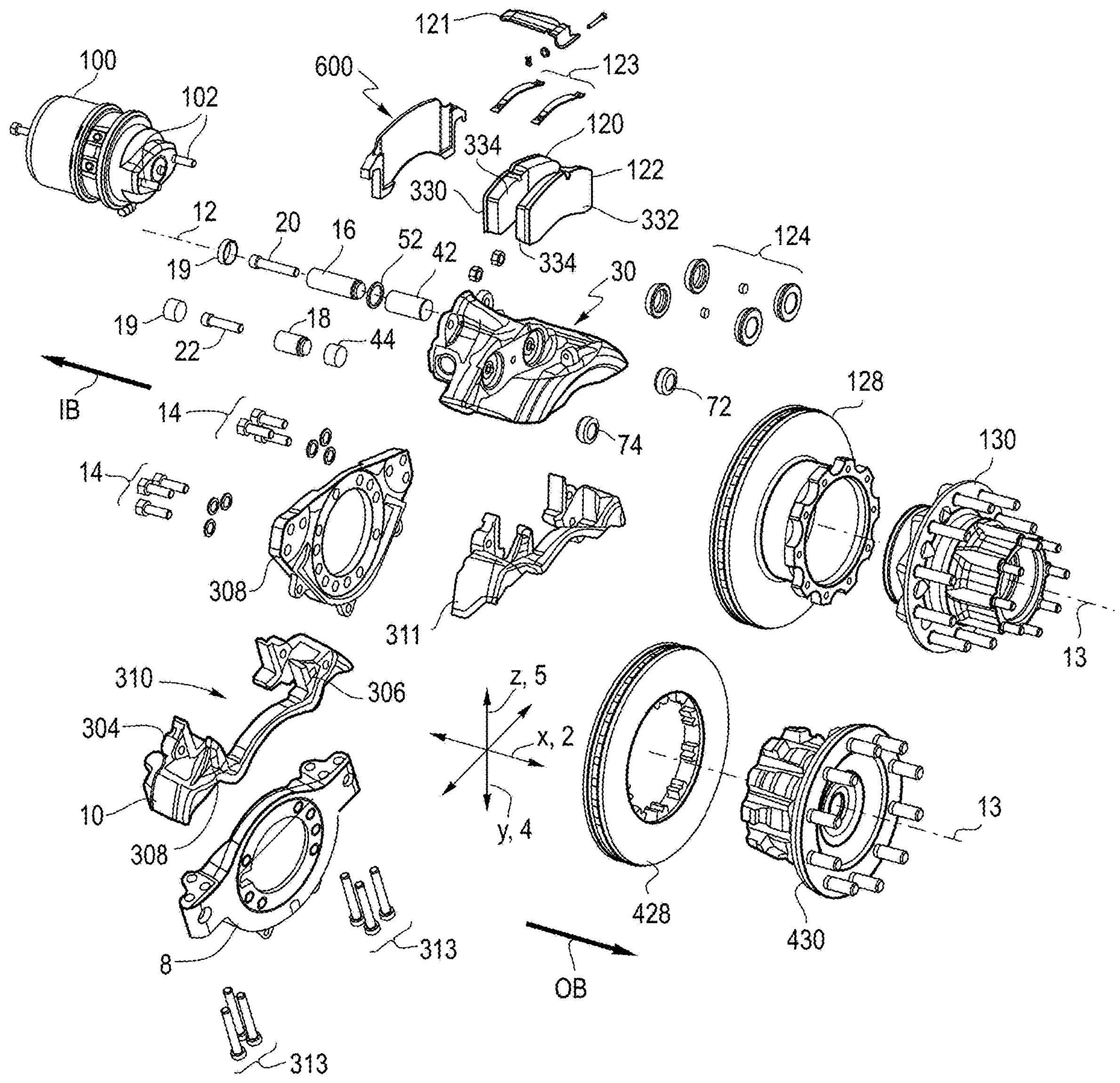
FIG. 16 is an exploded view of one embodiment of an air disc brake system.

Referring to FIG. 16, an air disc brake system 6 includes a torque plate 8, 309 and a carrier 10, 311 connected to the torque plate 8, 309, for example with a plurality of fasteners 14, 313, which may include a combination of bolts and washers. The fasteners 14, 313 may be oriented parallel to an axis of wheel rotation, or perpendicular to the axis. The carrier 10 has an inboard leading pad support 302, an inboard trailing pad support 304, an outboard leading pad support 306, and an outboard trailing pad support 308. It should be understood that the terms "leading" and "trailing" refer to the orientation of various components, such as the pad supports, on the carrier 10, and corresponding brake system 6, when installed on one side of the vehicle, and that the brake system 6 and carrier 10 may be installed on an opposite side of the vehicle, with the "leading" and "trailing" components being reversed. As such, a leading pad support 302 on one side of the vehicle may be a trailing pad support on the other side, and vice versa.

Referring to FIGS. 2-10, the pad supports 302, 304, 306, 308 may be referred to as horns, in that then extend outwardly from the carrier 10, for example in a Z-direction 5. It should be understood that the X direction 2 is not necessarily horizontal, or the Z direction 5 vertical, but rather that those directions are orthogonal and may rotate about the Y axis 4 depending on the location of the disc brake system 6, which may be positioned at any orientation about the Y axis. The inboard leading and trailing pad supports 302, 304, or horns, are spaced apart in the longitudinal direction 2 and define an inboard pad receiving opening 310, while the outboard leading and trailing pad supports 306, 308 are spaced apart in the longitudinal direction 2 and define an outboard pad receiving opening 312. As shown in FIGS. 3-7, for example and without limitation, the inboard and/or outboard leading pad supports 302, 306 may each include a bearing surface 314, 316, otherwise referred to as an abutment surface, facing away from a corresponding one of the inboard and/or outboard receiving openings 310, 312.

Figure 1:
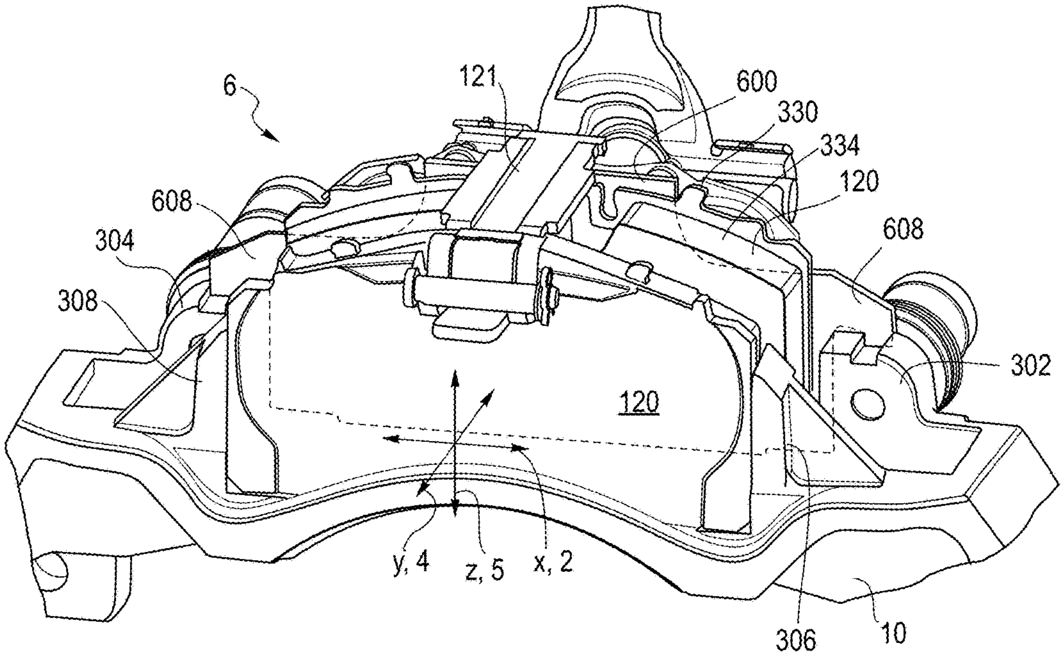
FIG. 1 is a perspective view of one embodiment of a disc brake system.
Figure 11:
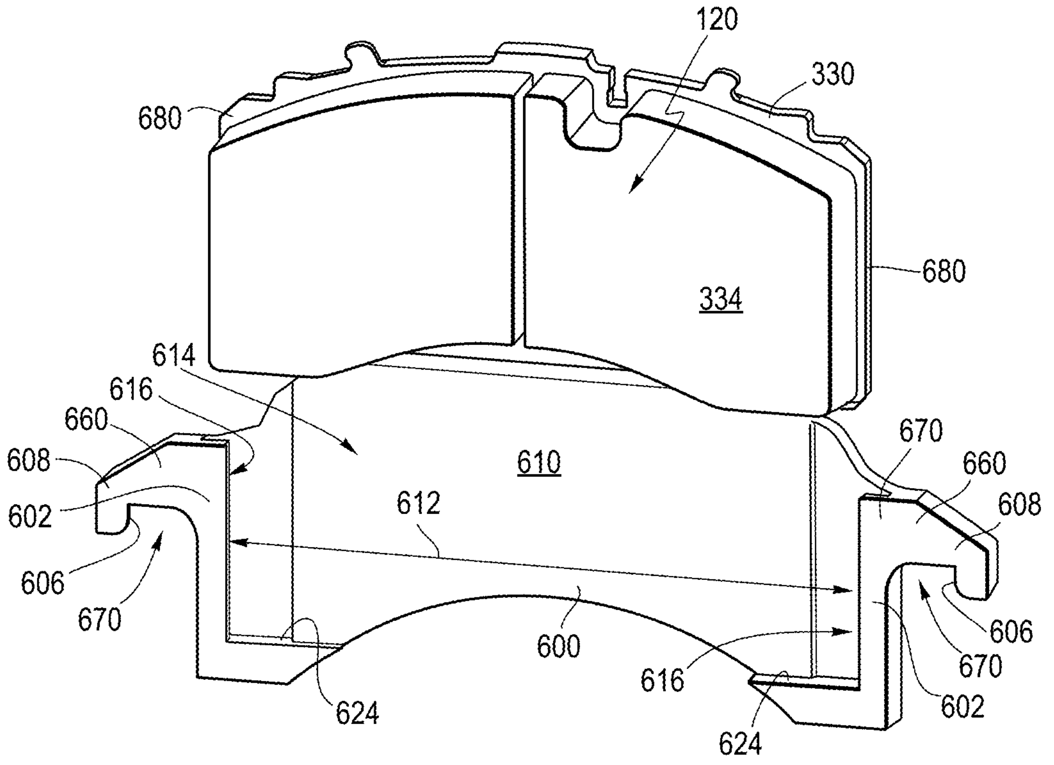
FIG. 11 is an exploded view of a brake pad and brake pad adapter plate.

As shown in FIG. 1, an inboard brake pad 120 is disposed in the inboard pad receiving opening 310 and an outboard brake pad 122 is disposed in the outboard pad receiving opening 312. The inboard and outboard brake pads 120, 122 may be secured to an adapter plate 600. Referring to FIGS. 5, 6 and 8-11, for example, an inboard brake pad 120 may be secured to an adapter plate 600 having opposite leading and trailing ends 602, which engage the inboard leading pad support 302 and the inboard trailing pad support 304 respectively. The leading end 602 of the adapter plate includes a bearing surface 606, or abutment surface, facing toward the bearing surface of the pad support and the inboard pad receiving opening 310. For example, in one embodiment, the leading end 602 includes a tab 608 defining the bearing surface 606. The bearing surfaces 606, 314, or abutment surfaces, are configured to engage when the disc brake system 6 is actuated such that at least a portion, and in particular the leading end, of the adapter plate 600 is put in tension. It should be understood that both, or only one, of the ends of the adapter plate 600 may include bearing/abutment surfaces 606. In one embodiment, as shown in FIG. 11, the adapter plate 600 is modular, and may be symmetrical about a centerline axis, with both the leading and trailing ends having a tab 608 defining the bearing surface 606. At an inboard location on one side of the vehicle, one of the tabs 608 is positioned as a leading end, while on the other side of the vehicle, the other of the tabs 608 is positioned as the leading end. Moreover, the adapter plate 600 may also be positioned on an outboard side of some brake systems, with the tabs 608 defining the leading and trailing ends. In other embodiments, the adapter plate 600 may not be modular, with the adapter plate configured with different trailing and leading ends, with the leading ends configured with a bearing surface 606.

The adapter plate 600 includes a support plate 610 extending between and connecting the leading and trailing ends 602, wherein the support plate is laterally spaced from a space 612 defined between the leading and trailing ends. The support plate 610 and the leading and trailing ends 602 define a three-sided cavity 614, which includes the space 612, configured to receive the brake pad 120. In one embodiment, the tab 608 at the leading end 602 of the adapter plate is configured as a hook member, which defines the bearing/abutment surface 606. The leading and trailing ends 602 also each include, or are configured with a slot 616, extending in the Z direction 5, that is configured and shaped to receive an end portion 618 of the brake pad 120, and in particular an end portion 618 of a backing plate 330. In one embodiment, shown in FIG. 7, the leading end 602 may also include the tab 640 configured with a hammerhead shape defining a pair of bearing surfaces 622 facing the toward the space 612.

Figure 9:
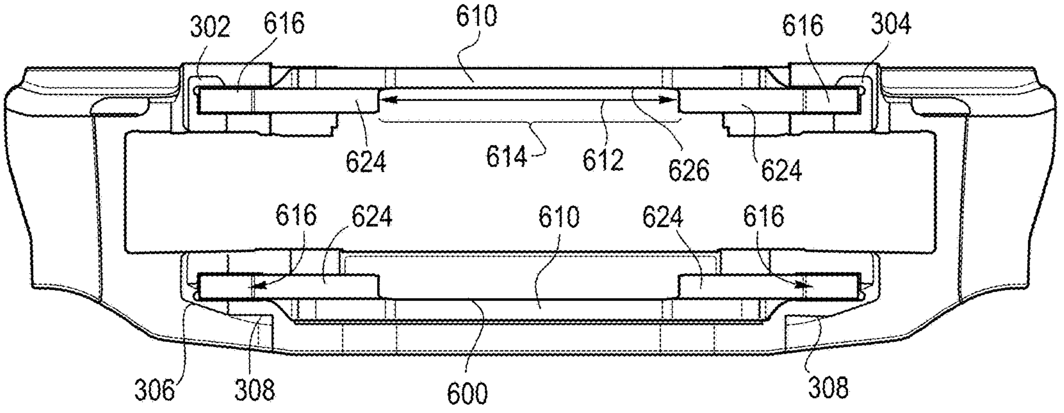
FIG. 9 is a to view of a pair of brake pad adapter plates supported on the inboard and outboard sides of the carrier shown in FIGS. 3 and 4.
Figure 10:
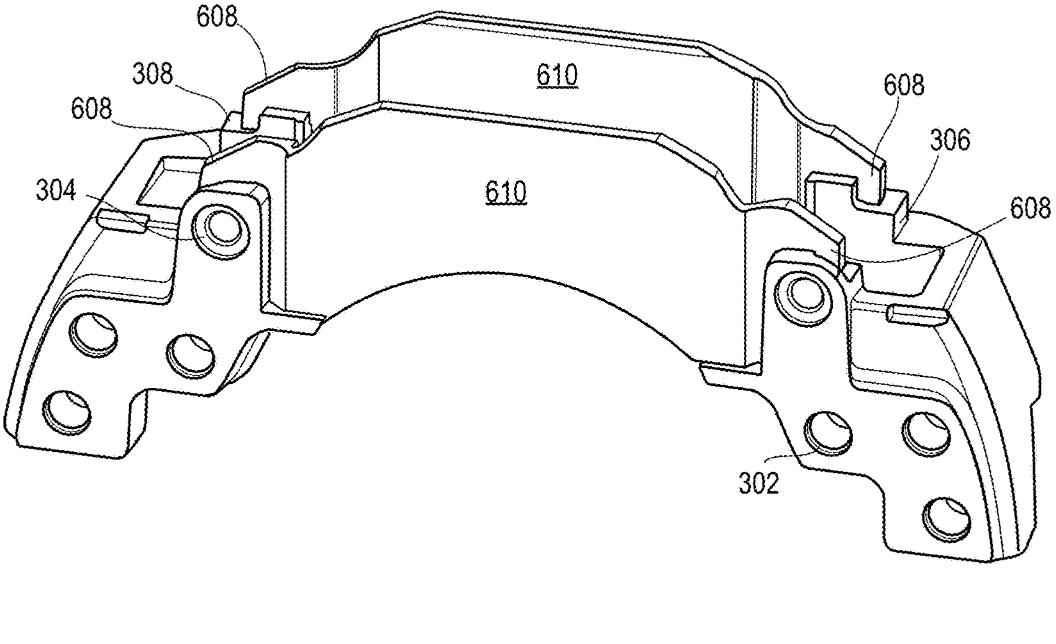
FIG. 10 is an inboard perspective view of the brake pad adapter plates and carrier shown in FIG. 5.

Referring to FIGS. 9 and 11, the brake pad adapter plate 600 also includes a floor portion, or a pair of floor portions 624, otherwise referred to as support shelves, extending laterally from at least one of the support plate 610, the leading and/or the trailing ends 602 beneath the space 612 and defining in part the cavity 614. In one embodiment, the floor portion 624, or a pair of floor portions, or shelves, define in part corners of a four-sided cavity 616, and extend laterally from the support plate 610 and inwardly from the leading and trailing ends 602. In one embodiment, the support plate 610 has an undulating surface 626, or face, facing the space 612 and defining in part the cavity 614, with the surface 626 including peaks 628 and valleys 630 that accommodate and are complimentary of a mating face 632 of the brake pad backing plate 330.

Figure 2:
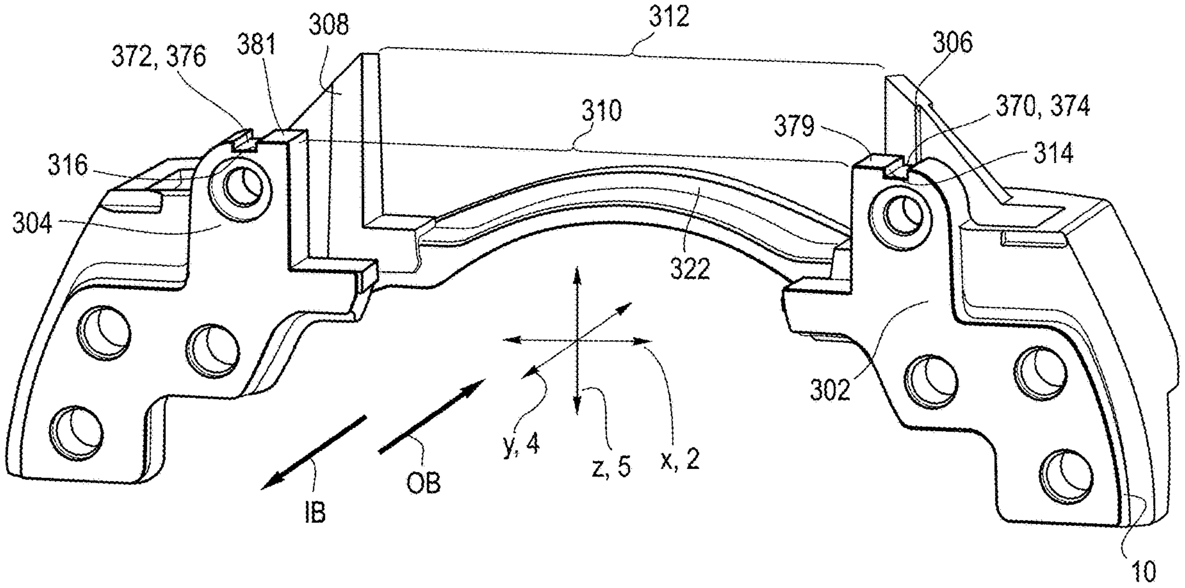
FIG. 2 is an inboard perspective view of one embodiment of a carrier.
Figure 3:
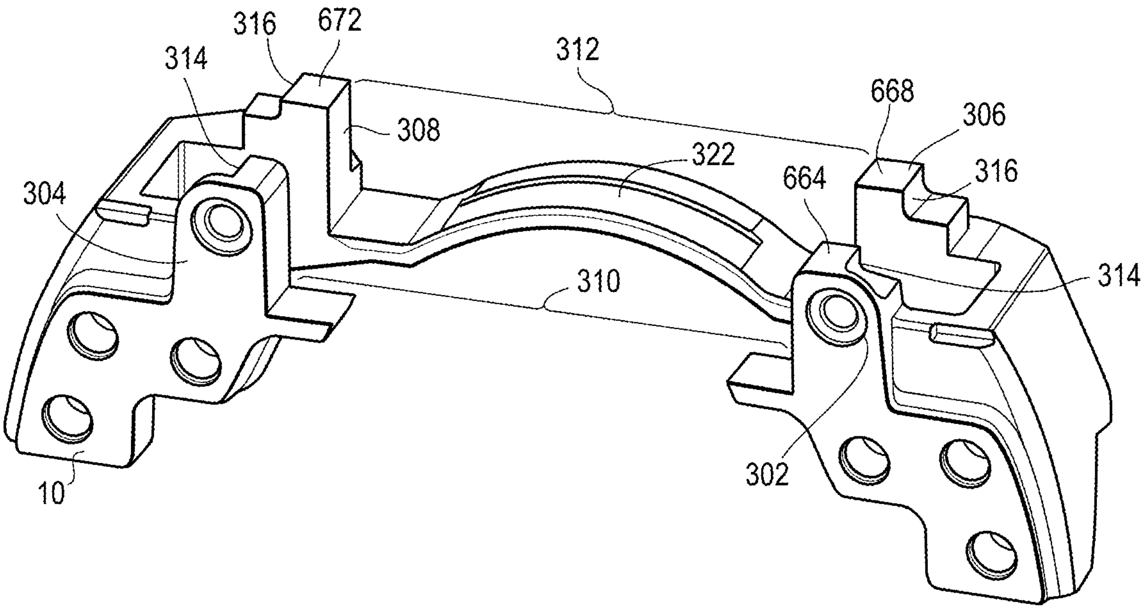
FIG. 3 is an inboard perspective view of another embodiment of a carrier.
Figure 4:
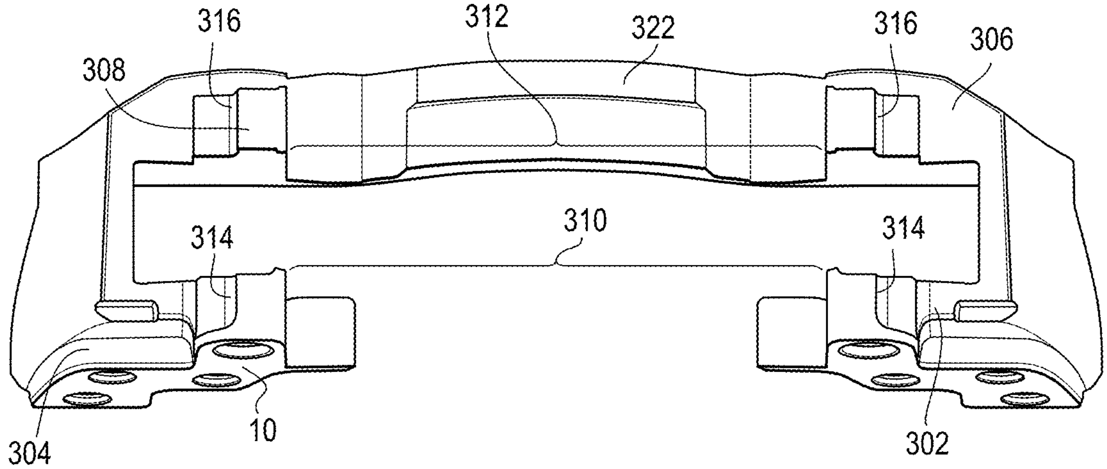
FIG. 4 is a top view of the carrier shown in FIG. 3.
Figure 5:
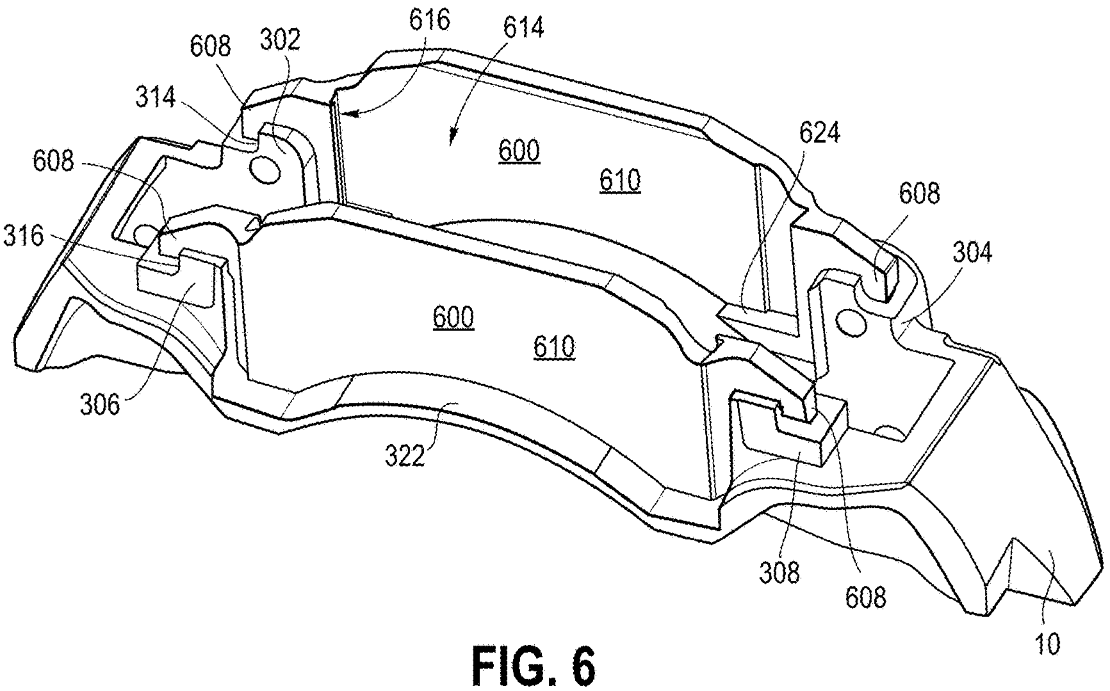
FIG. 5 is an outboard perspective view of a pair of brake pad adapter plates supported by a carrier.
Figure 6:
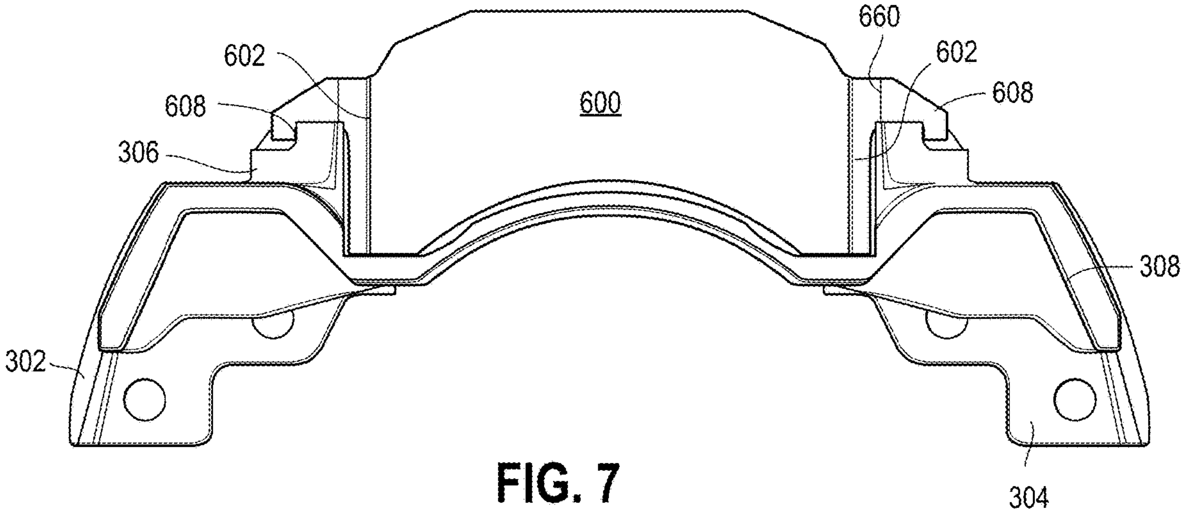
FIG. 6 is side view of the carrier and brake pad adapter plates shown in FIG. 5.

In one embodiment, the inboard leading and trailing pad supports 302, 304 are laterally spaced from the outboard leading and trailing pad portions 306, 308 in the lateral Y direction 4. In the embodiment of FIG. 2, the carrier 10 includes a beam 322 extending between and connecting the outboard leading and trailing pad supports 306, 308. Referring to the embodiment of FIGS. 3-6 and 10, both the outboard and inboard leading pad supports 302, 306 define a bearing surface 314, 316, or abutment surface, that may be engaged by corresponding bearing surfaces 606, or abutment surfaces, on leading ends 602 of the outboard and inboard adapter plates 600 as shown in FIGS. 5 and 6. The leading ends 602 are longitudinally spaced in the longitudinal X direction 2 from trailing ends 602 of the adapter plates 600.

Figure 7:
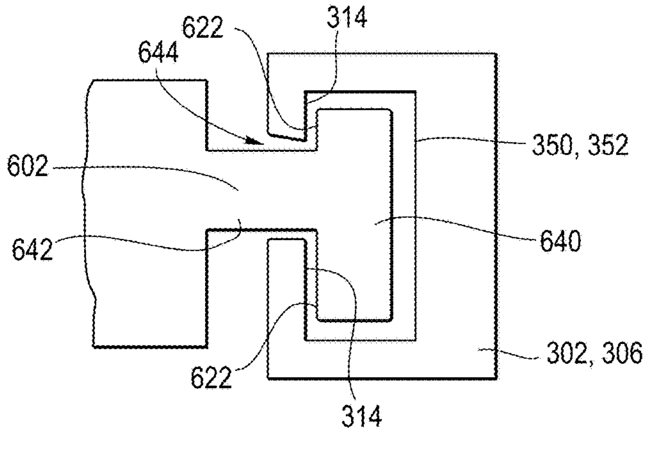
FIG. 7 is a partial side view of one embodiment of a brake pad adapter plate leading end supported by a carrier.

In one embodiment, shown in FIG. 7, the inboard and/or outboard leading pad support 302, 306 includes a pair of spaced apart first bearing surfaces 316 facing away from the inboard and/or outboard pad receiving openings 310, 312. Likewise, each of the inboard and/or outboard adapter plates may include a pair of spaced apart second bearing surfaces 622 facing toward the first bearing surfaces 316 and the corresponding one of the inboard and/or outboard receiving openings 310, 312 wherein the pairs of first and second bearing surfaces 622, 316, or abutment surfaces, are configured to engage when the disc brake system is actuated.

In one embodiment, shown in FIG. 7, the inboard and/or outboard leading pad supports 302, 306 are configured with a T-shaped opening 350, 352 defining the pair of spaced apart first bearing surfaces 314, 316. Correspondingly, the inboard and/or outboard adapter plates 600 each have a hammerhead (T-shaped) end portion 640 defining the pair of spaced apart second bearing surfaces 622, wherein the hammerhead end portion 640 is disposed in a corresponding one of the T-shaped openings 350, 352. The hammerhead end portions 640 each have a neck portion 642 that extends through a mouth 644 of the T-shaped opening 350, 352, with the neck portion 642 being put in tension during braking as described further herein below. In various embodiments the end portions 640 and the openings 350, 352 have complimentary shapes, which may be configured other than as a T-shape or hammerhead shape, but with mating abutment surfaces.

In the embodiment of FIG. 2, the pad supports 302, 304 are configured with a slot 370, 372 having a mouth 374, 376 opening outwardly in the Z direction 5 at a location spaced from the pad receiving openings 310, such that a support wall 379, 381 is formed and defines the bearing surface 314, 316. The adapter plates 600 each include a tab 608 that may be inserted into the slot 370, 372, with a neck 660 connecting the tab 608 to the support plate 610 portion of the adapter plate being put in tension and bending during actuation of the brake system 6.

In the embodiment of FIGS. 3-6, the pad supports 302, 306 are configured with an upstanding support wall 664, 668 defining the bearing surfaces 314, 316. The adapter plates 600 each include a tab 608 (e.g., L-shaped or elbow shaped) defining an opening 670 disposed over a top 672 of the support wall and defined by the neck 660, such that the bearing surfaces 606, 314, 316 are aligned, thereby ensuring that the neck 660 may be put in tension and bending during actuation of the brake system 6.

In various embodiments, either and/or both of the inboard and outboard leading pad supports 302, 306 may include a first bearing surface 314, 316, and either and/or both of the inboard and outboard adapter plates 600 may include the second bearing surface 606 engaging the first bearing surface 314, 316. In other embodiments, each of the inboard leading pad support 302, the inboard trailing pad support 304, the outboard leading pad support 306, and the outboard trailing pad support 308 are configured with a slot or opening 370, 372, 350, 352, whether T-shaped, elbow shaped or opening outwardly along the Z axis, or support wall 664, 668, with the adapter plates being configured with opposite ends having tabs disposed in corresponding ones of the slots and/or engaged with the bearing surfaces of the support walls.

The carrier 10 may be made of cast metal, with the pad supports defined during casting. Subsequently, the slots 350, 352, 370, 372, and/or the bearing surfaces 314, 316, may be formed by machining. In this way, the carrier may be suitable for both a conventional brake pad system, or may be modified to accommodate the adapter plate 600. In a conventional carrier design, vertical side edges of the brake pads engage vertical and horizontal carrier abutment surfaces defining the pad receiving openings 310, 312, which must be machined to finished dimensions and tolerances on both the inboard and outboard abutment surfaces. Use of the adapter plate 600, which abuts the surfaces 314, 316, allows the former vertical and horizontal abutment surfaces to remain "as cast," reducing the amount of machining and associated cost of producing the carrier 10. Instead, only the slots 350, 352, 370, 372 and/or the bearing surfaces 314, 316 that interact/interface with the adapter plate 600 need to be machined. If the abutment plate 600 is incorporated only on the inboard side of the brake system, then the machining may be reduced as explained on the inboard side of the carrier 10, while outboard pad receiving opening 312, and specifically the horizontal and vertical abutment surfaces defining the opening 312, would still need to be machined. If adapter plates 600 are used on both the inboard and outboard locations, then machining would be reduced to only include the guide slots and/or bearing surfaces for the adapter plates on the top of the carrier pad supports 302, 306. In this way, the overall cost and effort to manufacture the carrier 10 is greatly reduced by way of the more limited machining required.

The inboard and outboard brake pads 120 each include a backing plate 330 and a friction material 334 supported by the backing plate 330. At least a portion of the inboard backing plate 330 and/or inboard friction material 334 is disposed in the inboard pad receiving opening 310, while at least a portion of the outboard backing plate 330 and/or outboard friction material 334 is disposed in the outboard pad receiving opening 312.

Figure 8:
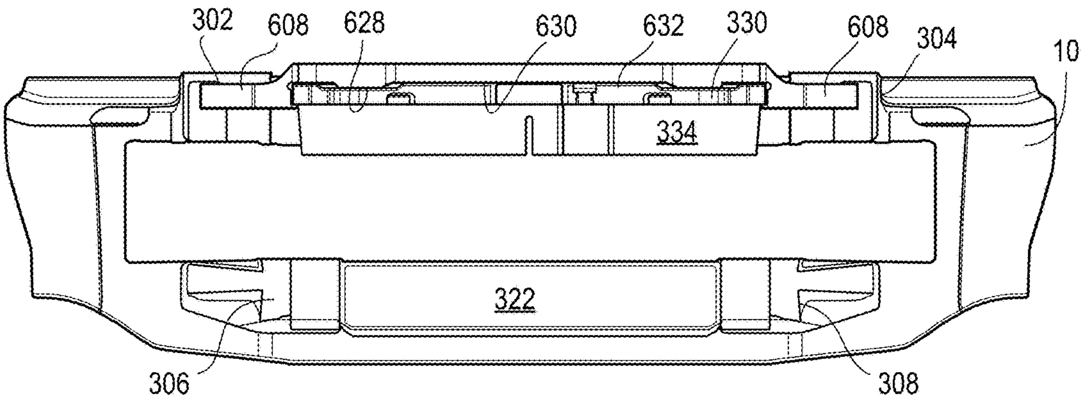
FIG. 8 is a top view of a brake pad adapter plate and brake pad supported on an inboard side of the carrier shown in FIG. 2.
Figure 12:
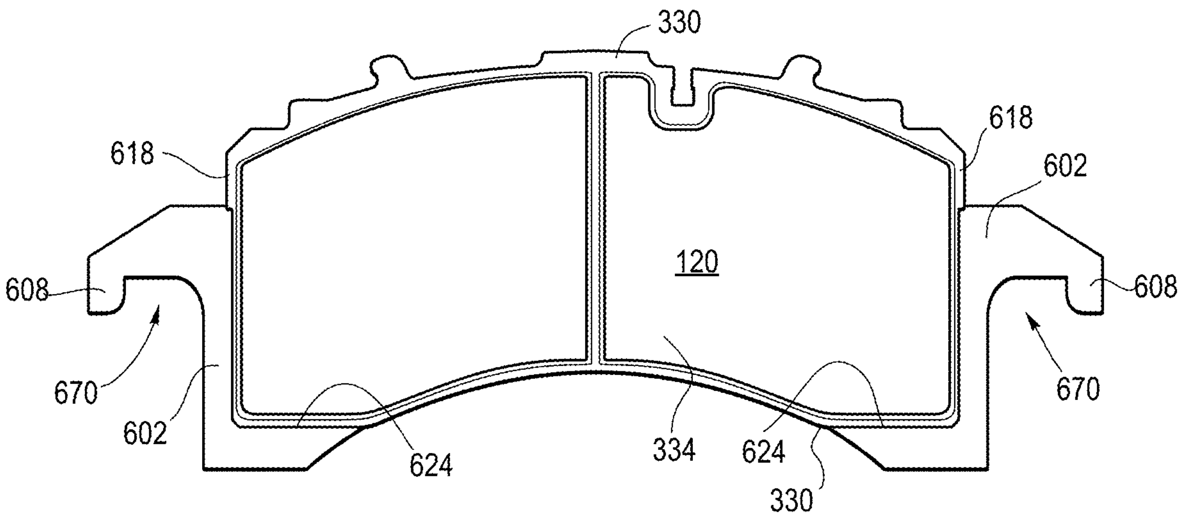
FIG. 12 is a side view of a brake pad installed on a brake pad adapter plate.
Figure 13:
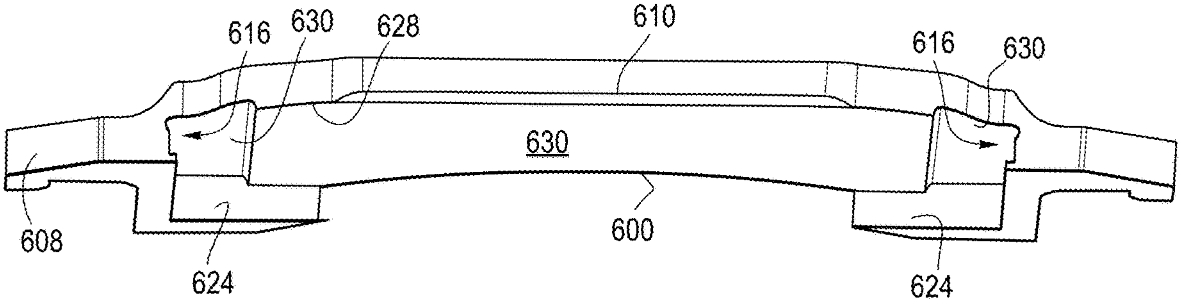
FIG. 13 is a top view of a brake pad adapter plate.
Figure 14:
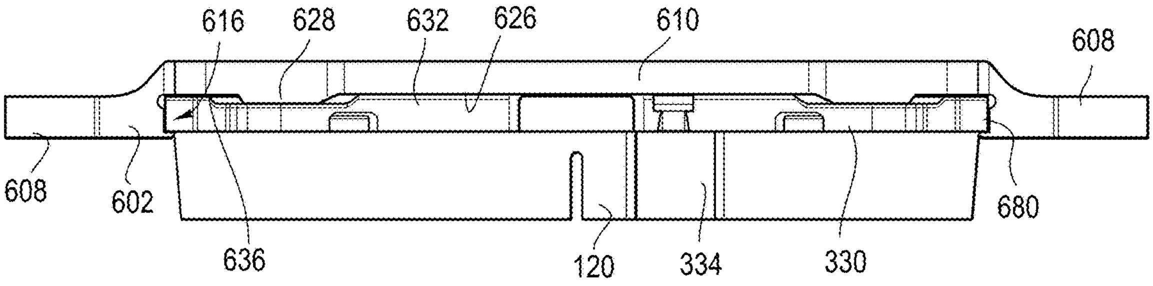
FIG. 14 is a top view of the brake pad adapter plate shown in FIG. 13 with a brake pad installed thereon.
Figure 15:
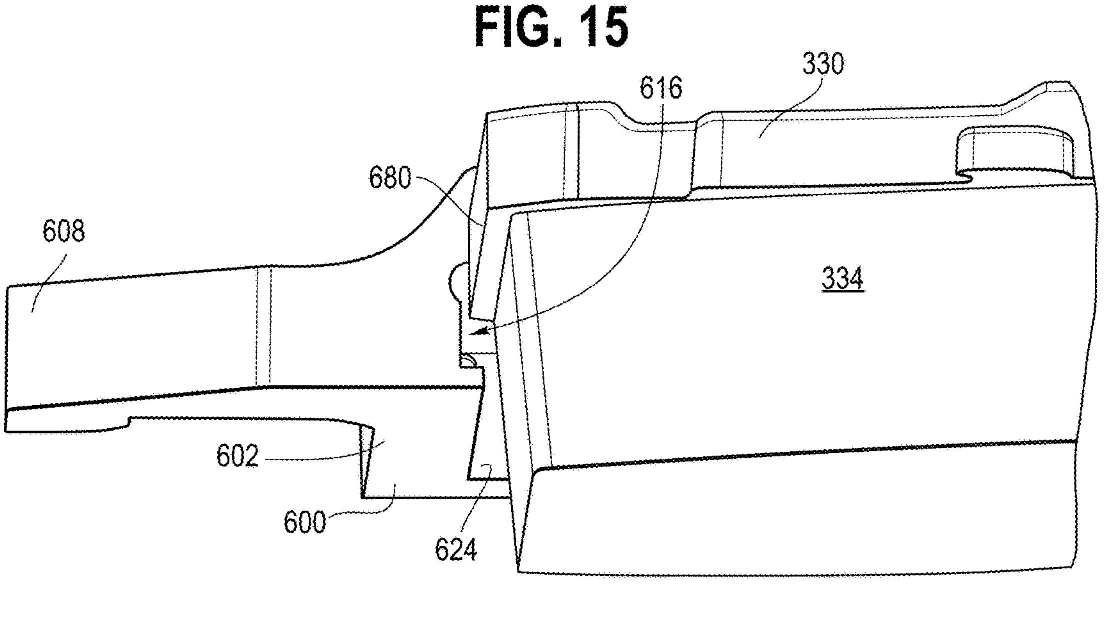
FIG. 15 is an enlarged partial, exploded view of an end of a brake pad and brake pad adapter plate.

In one embodiment, the inboard backing plate 330 is removably coupled to the inboard adapter plate 600 and the outboard backing plate 330 is removably coupled to the outboard adapter plate 600. In one embodiment, the backing plates 330 each include spaced apart insert portions 680 slidably received in the slots 616, or grooves, defined by the adapter plate 600, with the back plate 330, and brake pad 120, being translated or slide along a Z axis direction from an unassembled position to an assembled position as shown in FIGS. 11 and 12 respectively. In one embodiment, the insert portions 680 may be defined by opposite ends of the inboard backing plate 330, which extend outwardly in the X direction 2 from the friction material 334. A bottom edge of the inboard backing plate 330 may engage, or abut, and be supported by the floor or shelf portions 624 of the adapter plate 600. In this way, the brake pad 120 is prevented from moving in the X or tangential direction 2 and the Y direction 4 by the ends of the backing plate, defining the insert portions 680, engaging ends 602 of the adapter plate 600, and or by way of engagement with the support plate 610, and is prevented from moving toward the wheel axis in the Z direction by way of engagement with the support floor 624. The support plate 610 is offset laterally from the leading and trailing ends 602, as shown in FIGS. 8 and 9, such that the leading and trailing ends 602, the surface 626 of the support plate 610 and the support floors 624 define the cavity 614 shaped to receive the brake pad 120, including the backing plate 330. As mentioned, the support plate and backing plate may include a corresponding undulating surfaces, with opposing valleys and peaks.

Figure 18:
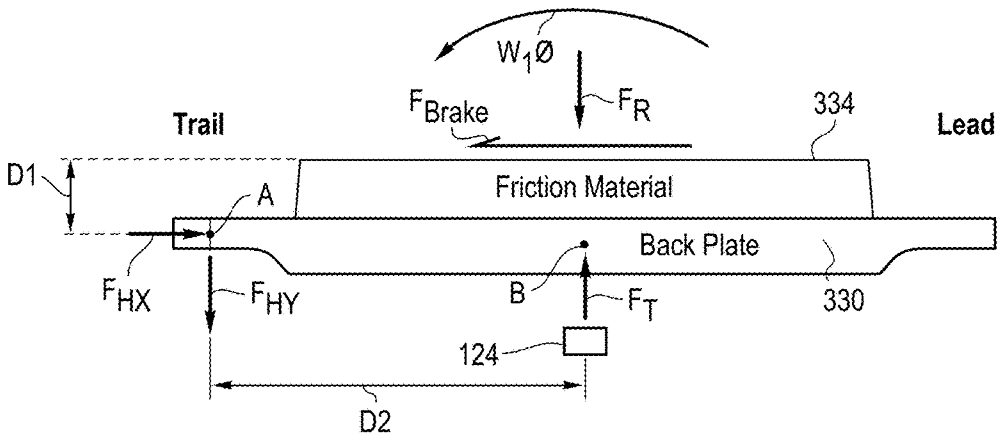
FIG. 18 is schematic diagram showing the load path in a brake pad.
Figure 19A:
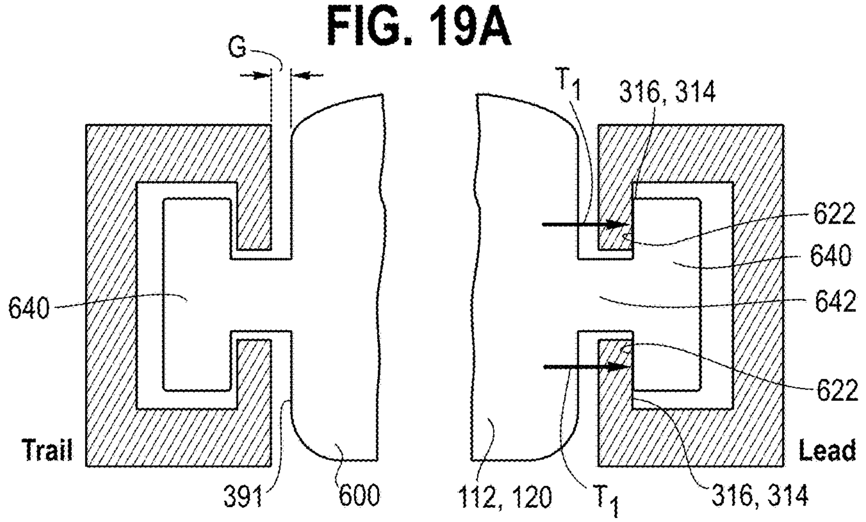
FIG. 19A is a schematic representation of the load transfer from a brake pad to an anchor plate during a low torque braking operation.
Figure 19B:
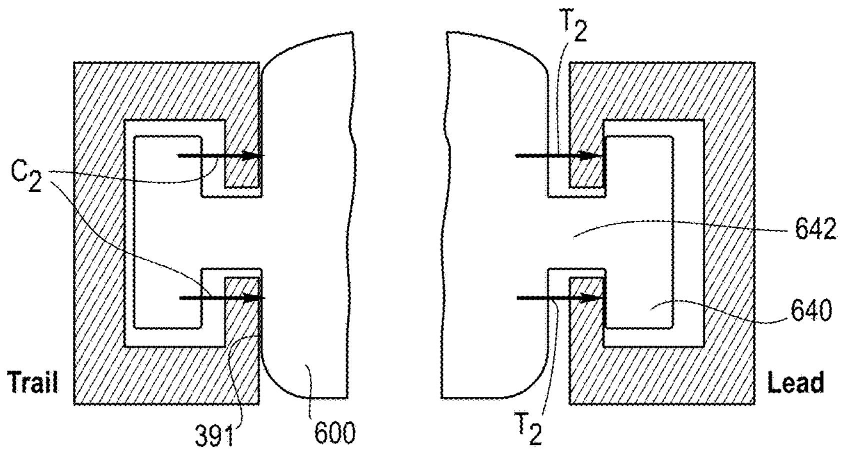
FIG. 19B is a schematic representation of the load transfer from a brake pad to an anchor plate during a low torque braking operation.

In operation, and referring to FIGS. 18-19B, the method of actuating the disc brake system 6 includes engaging the rotor 128 rotating about a wheel axis 13 with inboard and outboard brake pads 120. As the rotor 128 is engaged by the pads 120, a friction force Fbrake is applied to the friction material 334 in a tangential direction relative to the pad and brake disc contact path. This produces a force in the direction of sliding and a moment about the center of contact pressure. The moment is generated by the forces on the leading end of the brake pad 120 including an outwardly directed radial force component while the trailing end of the brake pad experiences an inwardly directed radial force component, resulting in a moment about the center of contact pressure. At the same time, a force Ft is applied normal to the pad backplate friction material 334 in the Y direction by one or more tappets 124. Considering the sum of forces in the Y-direction reveals Ft=Fr+Fhy, where a corresponding normal force Fr is the reaction force applied by the rotor to the rotor 128. The adapter plate 600 has a frictional force Fhx applied thereto by relative sliding between the carrier 10 and the adapter plate 600 to counter the Fbrake force. The braking forces coupled with the pad geometry create a moment (M1) about the radial axis local to the center of pressure between the pad and brake disc contact area, with M1=Fbrake×D1. M1 superimposed over Fr produces an uneven pressure distribution in the direction of sliding resulting in uneven friction material wear known as taper wear. In a conventional braking plate design, wherein the brake pad is not put in tension, a frictional force between the trailing end of the backplate and the carrier may produce a moment (M3) that further increases the uneven pressure distribution. Therefore, the total moment promoting friction material taper wear equals M1+M3. The disclosed embodiments of the adapter plate counteract M1 and M3 via at least two design functions. First, the adapter plate contact is shifted from the trailing end to the leading end of the adapter plate thus eliminating M3. Second, a moment (M2) is generated by Fhy×D2 acting in the opposite direction of M1 therefore counterbalancing the moments that cause friction material taper wear. In a dynamic force distribution, a greater force may be applied to the leading edge of the brake pads 120. A friction force Fhy is applied between the brake pad 120, 122 and carrier support pad 302, 306, which provides a moment M2=Fhy×D2 to counter the first moment (M1). This balanced moments (M1 and M2) may help to reduce the deflection of the brake pad 120, 122 and any corresponding tapered pad wear.

As shown in FIG. 19A, during low torque applications, the friction load (Fbrake) applied to the brake pad 120 may be absorbed or carried entirely by the bearing surfaces 622 of the adapter plate 600, which puts the neck portion 642 in tension in response to a load of 2T1. If only one bearing surface is presented, then the neck portion may experience tension and bending. The opposite end 391 of the adapted plate may not experience contact during low torque applications due to clearance G, thus loading only the leading end abutment of the bearing surfaces 314, 316. The load T1 increases directly proportional to braking force (Fbrake) thus increasing deflection of the carrier abutment surfaces 314, 316 and therefore reducing clearance G. This function produces a design mechanism to share braking forces across the leading and trailing abutments during high braking torques as the clearance G is closed, or becomes zero, as shown in FIG. 19B. This load sharing feature lowers peak bending moments resulting in material reducing opportunities and component mass optimization. In other embodiments, the adapter plate 600 experiences both compression and tension, or only tension. For example, in a high torque application, the load applied to the outboard brake pad is 2T2+2C2, as shown in FIG. 19B.

In essence, during braking, the friction on the brake pads 120 applies a tension force to a leading end 602 of at least one of the inboard and/or adapter plates 600 in response to engaging the rotor 128 with the brake pads 120. The tension force is absorbed with and by the carrier pad supports 302, 306 of the carrier 10. At the same time, a compression force may be applied to the trailing end 391 of at least one of the adapter plates 600 in response to engaging the rotor surface with the brake pads 120. The trailing end 602 may be configured with tabs having an L-shape or hammer head shape. In some embodiments, the abutting surfaces creating tension may be incorporated only on the inboard adapter plate to accommodate specific design requirements. These may include brake system designs where a taper wear countermeasure feature is only necessary for the inboard brake pad, or to accommodate pad installation where the pads may be installed only in a radial direction.

In some embodiments, shown in FIGS. 2 and 16, the outboard carrier support pads 306, 308, or horns, may not be configured with any bearing surfaces to absorb a tension load. Rather, the brake pad 120 is simply disposed in the pad receiving opening 312 and supported by the pad supports 306, 308, and is not configured without any tabs.

Figure 17:
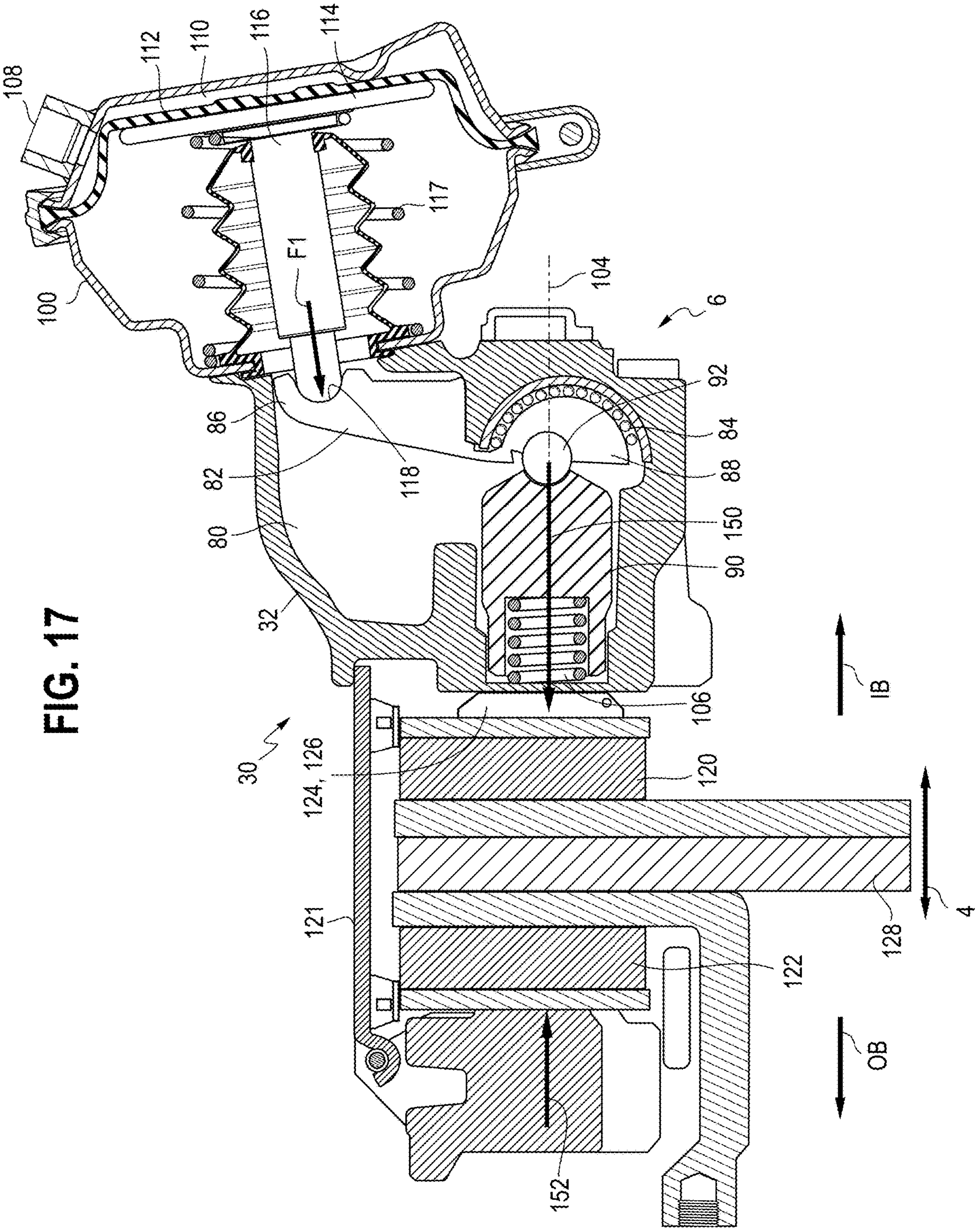
FIG. 17 is a cross sectional view of an air disc brake system.

Referring to FIGS. 16 and 17, the disc brake system includes a pair of guide pins 16, 18 mounted to the carrier 10 with fasteners 20, 22, shown as bolts, and extend in the axial longitudinal direction 2. In one embodiment, a first long guide pin 16 has a tight clearance fit and is the primary load carrying pin whilst first length and a second guide pin 18 has a greater clearance and is the secondary load carrying element. second length, with the first length being greater than the second length. In one embodiment, the guide pins 16, 18 are coupled to the carrier 10 by way of the fasteners 20, 22 through a threadable engagement with the housing or with nuts positioned on an opposite side of the housing, although the guide pins may be coupled by press fit, welding or other known fastening techniques. Each guide pin 16, 18 has an outer circumferential surface 24, 26. The guide pins may be cylindrical, or may have other shapes, including non-circular cross-sections. A caliper 30 includes a housing 32 having a pair of bores 34, 36 positioned to receive the guide pins 16, 18 respectively. A bushing 42, 44 is mounted in each bore 34, 36, for example by press fit, with the bushing engaging the inner circumferential surface 38, 40 of the guide pins.

The caliper housing 32 defines a cavity 80. A lever 82 is disposed in the cavity and is supported by two eccentric bearings 84 disposed in the cavity. The lever 82 has a first portion 86, or arm, extending laterally into the cavity and a second portion 88 engaging a bridge 90, for example through a cylindrical bearing or ball joint 92. The first portion 86 is engaged by an actuator 100, which may be mounted to the caliper housing 32 with fasteners 102. The bridge 90 is biased inwardly, away from the brake pads 120, 122 along a longitudinal axis 104 by a return spring 106.

The actuator 100 includes an air supply port 108 in fluid communication with a service brake chamber 110. As air is introduced into the chamber during application of the vehicle brakes, the air applies pressure in the chamber and expands the diaphragm 112 which in turn applies a force to and moves a pressure plate 114 and pushrod 116 in an axial direction. The pushrod 116 includes a pusher tip that engages the first portion 86 of the lever cup and pushes the lever 82. The lever 82 thereafter rotates and pivots about the eccentric bearing 84 from an unactuated home position to an actuated position where the clamping load equates to the actuator input force minus internal friction losses. As the lever 82 pivots, the second portion 88 of the lever engages and moves the bridge 90 outwardly in the axial direction from a first position to a second position against the force of the return spring 106. The bridge 90 is coupled to and moves a pair of tubes and tappets 124, 126, or single tappet, in the longitudinal direction 2 so as to move an inner brake pad 120 in the longitudinal direction. The inner brake pad 120 engages the brake rotor 128. Further movement of the bridge 90 forces the caliper 30, sliding on the guide pins 16, 18, away from the rotor 128 in the longitudinal direction 2 from a non-braking position to a braking position. The sliding movement of the caliper 30 on the guide pins 16, 18 moves the outer brake pad 120 inwardly toward an opposite side of the rotor 128, thereby clamping the rotor 128 between the inner and outer brake pads 12 and applying a braking force to the brake rotor 128 and attached wheel 130. The brake pads 120 are coupled to the carrier 10 and caliper with a pad retainer 121 and springs 123, together the adapter plates 600.

When the vehicle brakes are released, the air pressure in the service brake chamber 110 is exhausted and the return springs 117, 106 in the chamber and in the cavity acting on the bridge 90 return the air disc brake to a neutral, non-braked position. To maintain an appropriate running clearance gap between the rotor 128, 428 and the brake pads 120, 122 over time, the non-braked position may be mechanically adjusted by a mechanism in the caliper. The adjustment mechanism operates automatically whenever the brakes are activated, to compensate for rotor and brake pad wear and to keep the running clearance constant.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A disc brake system comprising:

a carrier comprising an inboard leading pad support, an inboard trailing pad support, an outboard leading pad support, and an outboard trailing pad support, wherein the inboard leading and trailing pad supports are spaced apart and define an inboard pad receiving opening, and wherein the outboard leading and trailing pad supports are spaced apart and define an outboard pad receiving opening, wherein the inboard leading pad support comprises a first bearing surface facing away from the inboard receiving opening;

an adapter plate comprising opposite leading and trailing ends engaging the inboard leading pad support and the inboard trailing pad support respectively, wherein the leading end of the adapter plate comprises a second bearing surface facing toward the first bearing surface and the inboard pad receiving opening, wherein the first and second bearing surfaces are configured to engage when the disc brake system is actuated such that at least a portion of the adapter plate is put in tension;

an inboard brake pad comprising an inboard backing plate supported by the adapter plate and an inboard friction material supported by the inboard backing plate, wherein at least a portion of the inboard backing plate and/or inboard friction material is disposed in the inboard pad receiving opening; and an outboard brake pad disposed in the outboard pad receiving opening.

2. The disc brake system of claim 1 wherein the outboard leading pad support comprises a third bearing surface facing away from the outboard pad receiving openings, wherein the adapter plate comprises a first adapter plate, and further comprising a second adapter plate comprising opposite leading and trailing ends engaging the outboard leading pad support and the outboard trailing pad support respectively, wherein the leading end of the second adapter plate comprises a fourth bearing surface facing toward the third bearing surface and the outboard pad receiving opening, wherein the third and fourth bearing surfaces are configured to engage when the disc brake system is actuated such that at least a portion of the second adapter plate is put in tension, and wherein the outboard brake pad comprises an outboard backing plate coupled to the second adapter plate and an outboard friction material supported by the outboard backing plate in the outboard pad receiving opening.

3. The disc brake system of claim 1 wherein the inboard leading pad support comprises a pair of spaced apart first bearing surfaces facing away from the inboard pad receiving opening, and wherein the leading end of the adapter plate comprises a pair of spaced apart second bearing surfaces facing toward the first bearing surfaces and the inboard pad receiving opening, wherein the pairs of first and second bearing surfaces are configured to engage when the disc brake system is actuated.

4. The disc brake system of claim 3 wherein the inboard leading pad support comprises a T-shaped opening defining the pair of spaced apart first bearing surfaces, and wherein the leading end of the adapter plate comprises a hammer-head end portion defining the pair of spaced apart second bearing surfaces, wherein the hammerhead end portion is disposed in the T-shaped opening.

5. The disc brake system of claim 1 wherein each of the inboard leading pad support and the inboard trailing pad support comprises a slot, and wherein each of the leading and trailing ends of the adapter comprise a tab disposed in corresponding ones of the slots.

6. The disc brake system of claim 5 wherein at least one of the slots is T-shaped, and at least one of the tabs has a hammerhead shape.

7. The disc brake system of claim 1 wherein the inboard backing plate is removably coupled to the inboard adapter plate.

8. The disc brake system of claim 7 wherein the inboard adapter plate comprises a pair of spaced apart slots, and wherein the inboard backing plate comprises spaced apart insert portions slidably received in the slots respectively.

9. The disc brake system of claim 8 wherein the insert portions are defined by opposite ends of the inboard backing plate.

10. The disc brake system of claim 8 wherein the inboard adapter plate comprises a floor supporting a bottom edge of the inboard backing plate.

11. The disc brake system of claim 7 wherein the inboard adapter plate comprises a support plate extending between the leading and trailing ends, wherein the support plate is offset laterally from the leading and trailing ends, wherein the leading and trailing ends and the support plate define a cavity shaped to receive the inboard backing plate.

12. The disc brake system of claim 11 wherein the support plate comprises a first undulating surface and the inboard backing plate comprises a second undulating surface mating with the first undulating surface.

13. A brake pad adapter plate adapted for use in a disc brake system, the adapter plate comprising:

spaced apart opposite leading and trailing ends defining a space therebetween, wherein the space is configured to receive a brake pad, wherein the leading and trailing ends are configured to engage leading and trailing pad supports of a carrier, wherein the leading end comprises a bearing surface facing toward the space defined between the leading and trailing ends, and wherein the leading end comprises a hook member defining the bearing surface; and a support plate extending between and connecting the leading and trailing ends, wherein the support plate is laterally spaced from the space between the leading and trailing ends, wherein the support plate and the leading and trailing ends define a cavity configured to receive a brake pad.

14. The brake pad adapter plate of claim 13 wherein the leading and trailing ends each comprise a slot configured to receive an end portion of the brake pad.

15. The brake pad adapter plate of claim 13 wherein the leading end comprises a tab having a hammerhead shape defining a pair of bearing surfaces facing the toward the space.

16. The brake pad adapter plate of claim 13 further comprising a floor portion extending laterally from at least one of the support plate, the leading end and/or the trailing end beneath the space and defining in part the cavity.

17. The brake pad adapter plate of claim 13 wherein the support plate comprises an undulating surface facing the space and defining in part the cavity.

18. A method of actuating a disc brake system comprising:

engaging a rotor rotating about an axis with inboard and outboard brake pads, wherein each of the inboard and outboard brake pads comprises a backing plate and a friction material coupled to the backing plate;

applying a friction force to the inboard and outboard brake pads in response to the engaging of the rotor; and transferring the friction force applied to at least one of the inboard and outboard brake pads to an adapter plate;

applying a tension force to the adapter plate; and absorbing the tension force with a carrier engaged by the adapter plate;

wherein the adapter plate comprises spaced apart opposite leading and trailing ends defining a space therebetween, wherein the space is configured to receive one of the inboard and outboard brake pads, wherein the leading and trailing ends are configured to engage leading and trailing pad supports of the carrier, wherein the leading end comprises a bearing surface facing toward the space defined between the leading and trailing ends, and wherein the leading and trailing ends each comprise a slot configured to receive an end portion of the one of the inboard and outboard brake pads.

19. The method of claim 18 wherein the applying the tension force comprises engaging the leading end of the adapter plate with a pad support defined by the carrier.

* * * * *